US008147226B2

(12) United States Patent
Koka et al.

(10) Patent No.: US 8,147,226 B2
(45) Date of Patent: Apr. 3, 2012

(54) VALVE ASSEMBLY FOR PRESSURE WASHER PUMP

(75) Inventors: Dinesh V. Koka, Memphis, TN (US); Gregory L. Parris, Jackson, TN (US); Kenneth D. Butler, Jackson, TN (US); Shane Dexter, Humboldt, TN (US); Allen C. Palmer, Arlington, TN (US); Michael C. Hollis, Jackson, TN (US); Jason F. Busschaert, Towson, MD (US)

(73) Assignee: Black & Decker Inc., Newark, DE (US)

( * ) Notice: Subject to any disclaimer, the term of this patent is extended or adjusted under 35 U.S.C. 154(b) by 1046 days.

(21) Appl. No.: 11/670,337

(22) Filed: Feb. 1, 2007

(65) Prior Publication Data

US 2007/0177989 A1 Aug. 2, 2007

Related U.S. Application Data

(60) Provisional application No. 60/763,960, filed on Feb. 1, 2006.

(51) Int. Cl.
*F04B 39/10* (2006.01)
*F04B 53/10* (2006.01)
*F16K 15/02* (2006.01)
*F16K 21/04* (2006.01)

(52) U.S. Cl. ......................... 417/568; 417/571; 137/512

(58) Field of Classification Search .................. 417/568, 417/454, 567, 569, 571, 559; 137/512
See application file for complete search history.

(56) References Cited

U.S. PATENT DOCUMENTS

| | | | | | |
|---|---|---|---|---|---|
| 181,168 | A | * | 8/1876 | Hill | 137/454.4 |
| 2,364,109 | A | | 12/1944 | Taylor | |
| 2,747,428 | A | | 5/1956 | Peter et al. | |
| 2,791,916 | A | | 5/1957 | Kintzing | |
| 3,325,609 | A | | 6/1967 | Otterlei | |
| 3,399,694 | A | * | 9/1968 | Vinson | 137/512 |
| 3,415,271 | A | * | 12/1968 | Maasberg et al. | 137/512 |
| 3,608,396 | A | | 9/1971 | Bentley | |
| D222,789 | S | | 12/1971 | Giacosa | |
| 4,339,988 | A | | 7/1982 | Steele | |
| D273,789 | S | | 5/1984 | Davis | |
| 4,477,236 | A | * | 10/1984 | Elliott | 417/454 |
| 4,520,842 | A | * | 6/1985 | Elliott | 137/327 |
| 4,638,683 | A | | 1/1987 | Ogawa et al. | |
| 4,813,342 | A | | 3/1989 | Schneider et al. | |
| 4,902,206 | A | | 2/1990 | Nakazawa et al. | |

(Continued)

FOREIGN PATENT DOCUMENTS

DE 4306621 9/1994

(Continued)

*Primary Examiner* — Devon C Kramer
*Assistant Examiner* — Bryan Lettman
(74) *Attorney, Agent, or Firm* — Harness, Dickey & Pierce, P.L.C.

(57) ABSTRACT

A pressure washer pump generally includes a pump housing that defines a cavity, an opening into the cavity and a bottom of the cavity generally opposite the opening. A valve assembly is disposed in the cavity through the opening. The valve assembly includes a cage member that contains a first valve mechanism. A plug member is received in the opening to fluidly seal the cavity of the pump housing. A compliant member is disposed between the plug member and the cage member. The cage member is disposed between the compliant member and the bottom of the cavity and spaced from the plug member.

5 Claims, 12 Drawing Sheets

U.S. PATENT DOCUMENTS

| | | | | |
|---|---|---|---|---|
| 4,926,904 | A | 5/1990 | Polk et al. | |
| 4,990,062 | A | 2/1991 | Swank | |
| 5,035,580 | A | 7/1991 | Simonette | |
| 5,048,366 | A | 9/1991 | Spanio | |
| 5,088,345 | A | 2/1992 | Kemmler et al. | |
| 5,176,296 | A | 1/1993 | Lina et al. | |
| 5,199,642 | A | 4/1993 | Rankin | |
| 5,228,840 | A | 7/1993 | Swank | |
| 5,324,134 | A | 6/1994 | Kaes et al. | |
| 5,421,520 | A | 6/1995 | Simonette et al. | |
| 5,484,268 | A | 1/1996 | Swank | |
| 5,533,425 | A | 7/1996 | Mabee | |
| 5,558,507 | A | 9/1996 | Magnus | |
| 5,626,466 | A | 5/1997 | Ruoff et al. | |
| 5,718,255 | A | 2/1998 | Gilpatrick et al. | |
| 5,769,321 | A | 6/1998 | Cyphers | |
| D396,478 | S | 7/1998 | Hubbach | |
| 5,857,396 | A | 1/1999 | Strouse, Jr. | |
| 5,871,152 | A | 2/1999 | Saney | |
| 5,902,094 | A | 5/1999 | Hoenisch et al. | |
| 6,126,410 | A * | 10/2000 | Kung et al. | 417/312 |
| 6,148,716 | A | 11/2000 | Swank | |
| 6,182,627 | B1 | 2/2001 | Matthews | |
| D455,761 | S | 4/2002 | Graber et al. | |
| 6,397,729 | B1 | 6/2002 | Dexter et al. | |
| 6,431,844 | B1 | 8/2002 | Dexter et al. | |
| 6,460,510 | B1 | 10/2002 | Breeden | |
| 6,467,394 | B1 | 10/2002 | Wood et al. | |
| D465,498 | S | 11/2002 | Geffert | |
| D466,131 | S | 11/2002 | Geffert | |
| D468,751 | S | 1/2003 | Neeley et al. | |
| 6,523,756 | B2 | 2/2003 | Dallmeyer et al. | |
| 6,536,472 | B2 | 3/2003 | Baumann | |
| 6,543,707 | B2 | 4/2003 | Dallmeyer et al. | |
| 6,662,784 | B1 | 12/2003 | Breeden | |
| D484,889 | S | 1/2004 | Neeley et al. | |
| D484,893 | S | 1/2004 | Hsiao | |
| 6,676,043 | B2 | 1/2004 | Dallmeyer et al. | |
| D487,751 | S | 3/2004 | Neeley et al. | |
| 6,701,958 | B2 | 3/2004 | Baumann | |
| 6,779,987 | B2 | 8/2004 | Dexter et al. | |
| 6,792,968 | B1 | 9/2004 | Breeden | |
| D497,917 | S | 11/2004 | Harper et al. | |
| 6,866,486 | B2 | 3/2005 | Dexter et al. | |
| 2003/0161742 | A1 | 8/2003 | Lin et al. | |

FOREIGN PATENT DOCUMENTS

| | | | |
|---|---|---|---|
| EP | 0 407 761 | | 1/1991 |
| EP | 0 437 664 | | 7/1991 |
| EP | 1 340 911 | | 9/2003 |
| JP | 56146084 | | 11/1981 |
| JP | 63189675 | * | 5/1988 |
| JP | 63189675 | | 8/1988 |
| JP | 1250608 | | 10/1989 |
| WO | WO 9013761 | | 11/1990 |

* cited by examiner

VALVE ASSEMBLY FOR PRESSURE WASHER PUMP

CROSS-REFERENCE TO RELATED APPLICATIONS

This application claims the benefit of U.S. Provisional Application No. 60/763,960, filed on Feb. 1, 2006. The disclosure of the above application is hereby incorporated by reference as if fully set forth herein.

FIELD

The present disclosure relates to a fluid pump for a pressure washer and more particularly relates to an oil-less high pressure pump with a valve cage member that holds a valve mechanism in a pump housing of the fluid pump.

BACKGROUND

High pressure washing devices, commonly referred to as pressure washers, deliver a fluid, typically water, under high pressure to a surface to be cleaned, stripped or prepared for other treatment. High pressure washing devices commonly employ an internal combustion engine or an electric motor that drives a pump that feeds a high-pressure spray wand via a length of hose. A garden hose, or other source of water, is connected to the pump inlet. The high-pressure hose and the spray wand or other tools are connected to the pump outlet.

Typically, pressure washers utilize a piston pump having one or more reciprocating pistons for delivering liquid under pressure to the high-pressure spray wand. The use of two or more pistons generally provides a more continuous spray, higher flow rate and greater efficiency. FIG. 1 provides a diagram of a known oil-less pump 1 that can be used in various suitable commercially available pressure washers and attached to various motors. The pump 1 includes a drive mechanism 2 that uses steel bands 3 to convert a rotary motion from a motor that rotates the drive mechanism 2. The drive mechanism 2 pulls on each of steel bands 3 at predetermined rotational intervals to impart a reciprocal linear motion that activates the pistons 4 in a piston assembly 5.

The pump 1 can experience excessive stresses on many components due to, for example, the rigidity of the steel bands 3 and certain production tolerances. In addition, the drive mechanism 2 can be complex and the pump 1 can experience loss of efficiency due to degrading seals that can be caused by twisting of the valve assemblies 6 during operation of the pump 1.

SUMMARY

The present teachings generally include a pressure washer pump. The pump generally includes a pump housing that defines a cavity, an opening into the cavity and a bottom of the cavity generally opposite the opening. A valve assembly is disposed in the cavity through the opening. The valve assembly includes a cage member that contains a first valve mechanism. A plug member is received in the opening to fluidly seal the cavity of the pump housing. A compliant member is disposed between the plug member and the cage member. The cage member is disposed between the compliant member and the bottom of the cavity and spaced from the plug member.

Further areas of applicability will become apparent from the description provided herein. It should be understood that the description and specific examples are intended for purposes of illustration only and are not intended to limit the scope of the present teachings.

BRIEF DESCRIPTION OF THE DRAWINGS

The drawings described herein are for illustration purposes only and are not intended to limit the scope of the present teachings in any way.

DETAILED DESCRIPTION

Figure 1:
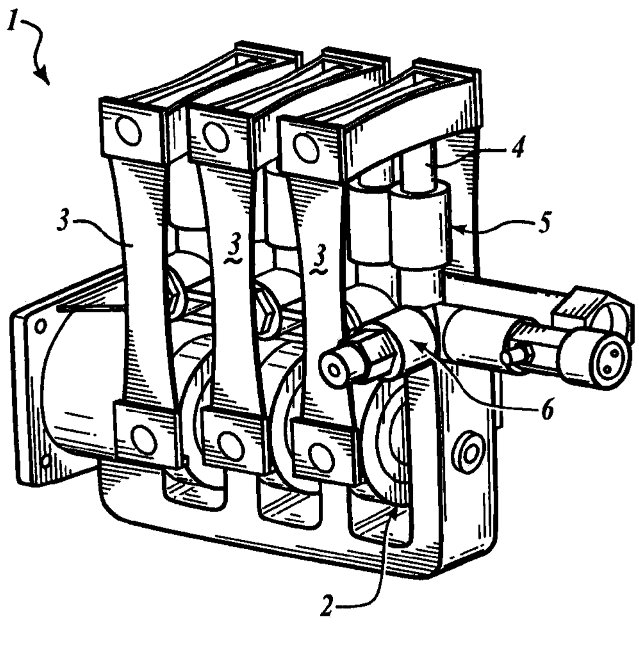
FIG.1 (PRIOR ART)
FIG. 1 is a perspective view of a known oil-less pump using metal straps in the conversion of rotational motion to linear reciprocal motion.

The following description is merely exemplary in nature and is not intended to limit the present teachings, their application or uses. It should be understood that throughout the drawings, corresponding reference numerals indicate like or corresponding parts and features.

Figure 2:
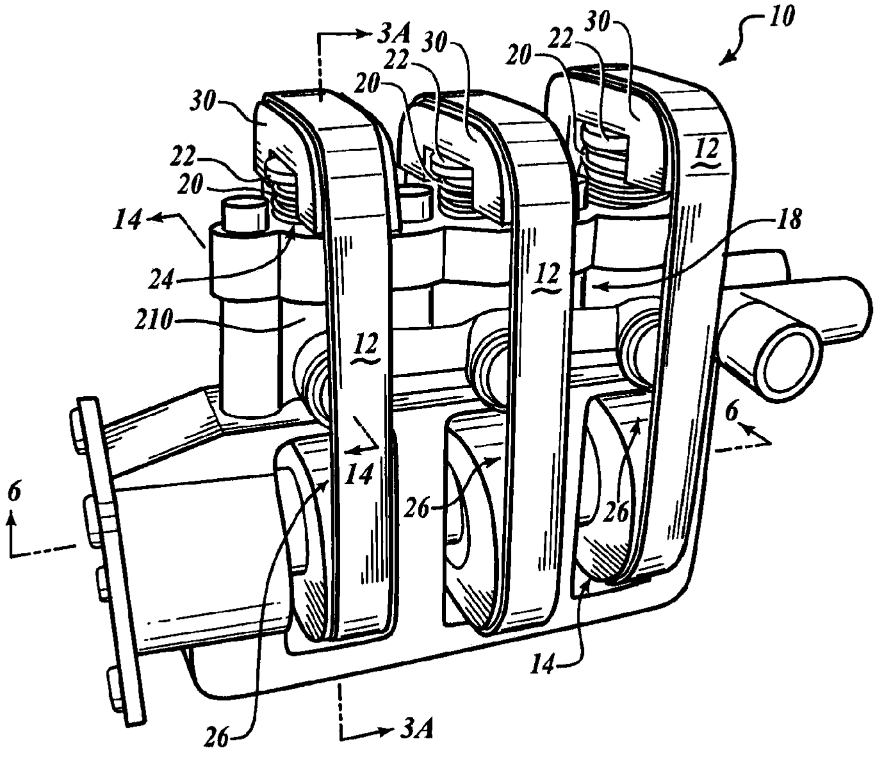
FIG. 2 is a perspective view of a fluid pump using flexible bands or belts to activate individual pistons in a pump housing constructed in accordance with the various aspects of the present teachings.
Figure 3C:
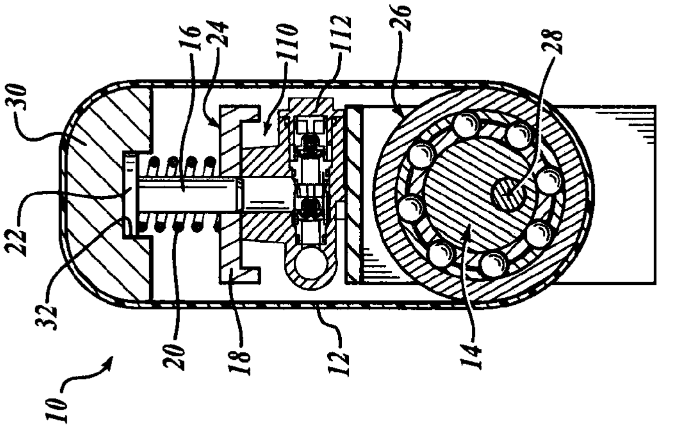
FIGS. 3B and 3C are similar to FIG. 3A and show a continued progression from FIG. 3A of an eccentric motion of a rotating shaft in the fluid pump of FIG. 2. The shaft is coupled to the flexible band that imparts a generally linear reciprocating motion associated with the activation of one of the pistons in the pump housing in accordance with the present teachings.
Figure 3B:
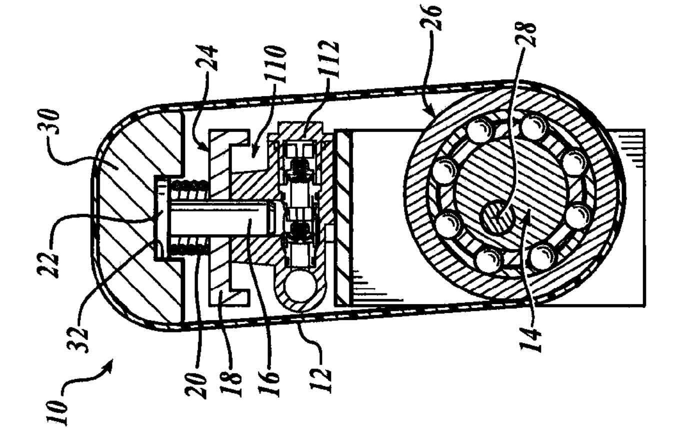
Figure 3A:
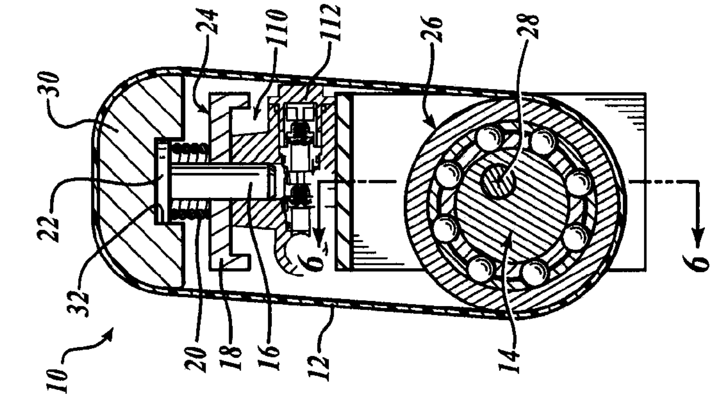
FIG. 3A is a diagram of a partial cross-sectional view of one of the pistons in the pump housing of FIG. 2.

With reference to FIG. 2, the present teachings generally provide a fluid pump 10 that uses flexible belts 12 that couple to a shaft 14. The fluid pump 10 can use the belts 12 instead of the steel bands 3, as shown in FIG. 1. In operation, the fluid pump 10 can generally convert a rotary motion imparted on the rotating shaft 14 by an engine or motor to a reciprocal and linear motion to actuate one or more pistons 16 disposed in a pump housing 18, as shown in FIGS. 3A, 3B and 3C. Each of the pistons 16 in the pump housing 18 can include a spring 20 that can be disposed between a piston flange 22 on the top of the piston 16 and a top portion 24 of the pump housing 18 (relative to FIG. 2).

With reference to FIGS. 3A, 3B and 3C, the spring 20 can bias the piston 16 toward a top dead center position (FIG. 3C). The shaft 14 can define one or more outer surfaces 26 that rotate in an eccentric fashion about an axis of rotation 28. The belts 12 can connect the outer surfaces 26 of the shaft 14 to a drive member 30 associated with one of the pistons 16. Each of the drive members 30 can receive one of the belts 12 on one side of the drive member 30 and receive one of the piston flanges 22 on the other side in an aperture 32 defined by the drive member 30.

The eccentric motion of the outer surfaces 26, relative to the drive members 30, can generally cause the shaft 14 to impart a force on the drive members 30 via the belts 12 to drive each of the pistons 16 downward at specific rotational intervals of the shaft 14 to provide suitable fluid pumping functionality. As the shaft 14 continues to rotate, the tension on the belts 12 are reduced and as such, the spring 20 can return the piston 16 to the top dead center position, as shown in FIG. 3C. It will be appreciated in light of this disclosure that the fluid pump 10 can be configured with a single piston 16 or multiple pistons 16.

The belts 12 can be suitable straps, flexible bands, etc. that are strong enough to impart the driving force on the piston 16 but can also be flexible enough to accommodate small imbalances and movements that previously could fatigue and stress various components of the fluid pump 10. The belts 12 can also be configured to be easily replaceable and easy to manufacture. Moreover, the belts 12 can be continuous around the drive member 30 and the shaft 14.

Figure 4:
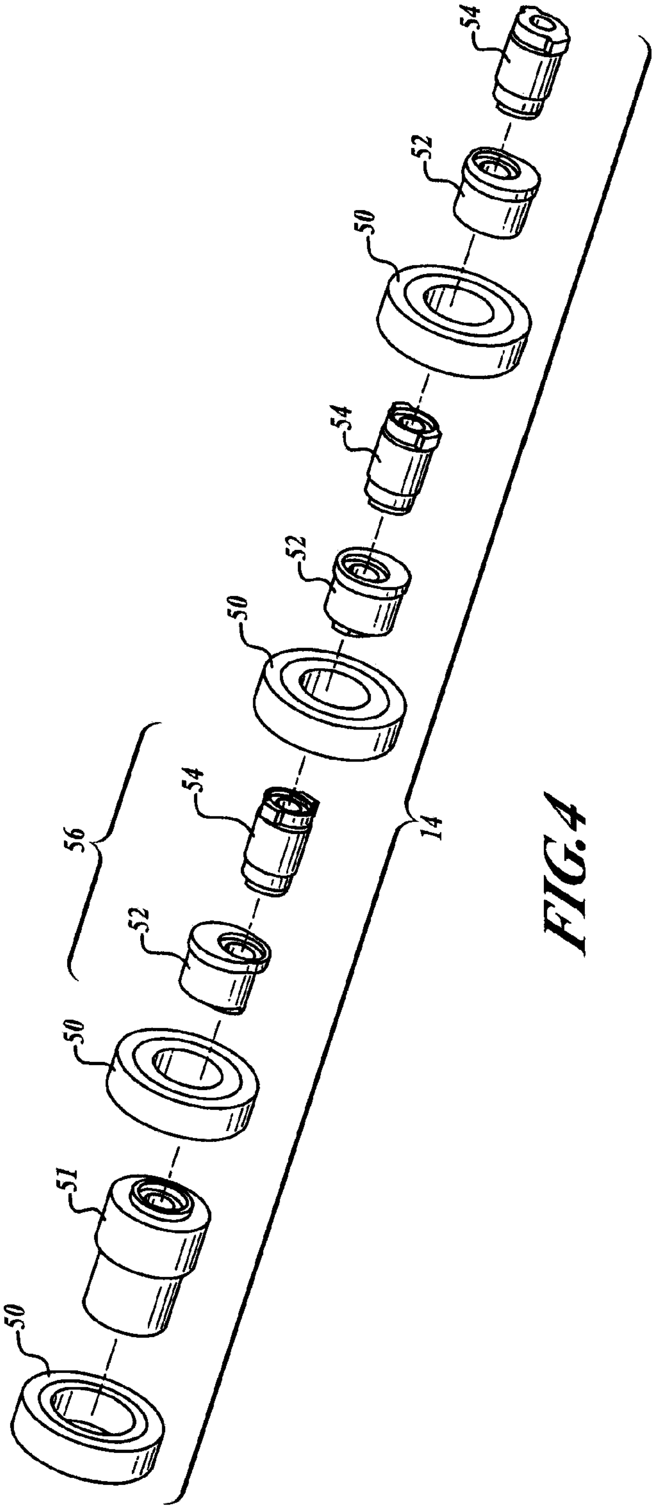
FIG. 4 is an exploded perspective view of the shaft of FIG. 2 showing a self-aligning multi-piece shaft constructed in accordance with one aspect of the present teachings.
Figure 5:
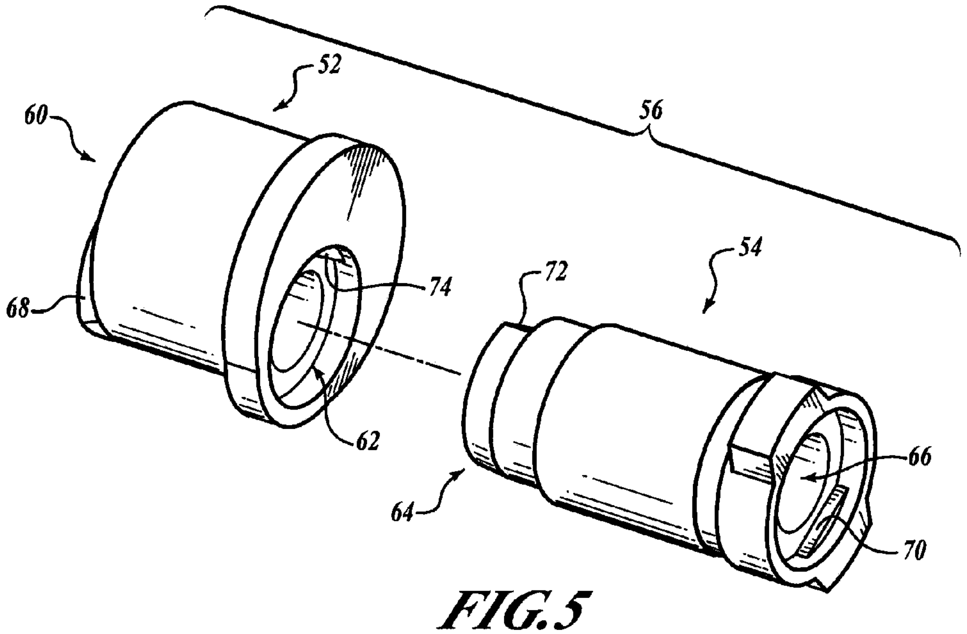
FIG. 5 is an exploded perspective view of an eccentric component and an intermediate component of the shaft of FIG. 4 constructed in accordance with the present teachings.
Figure 6:
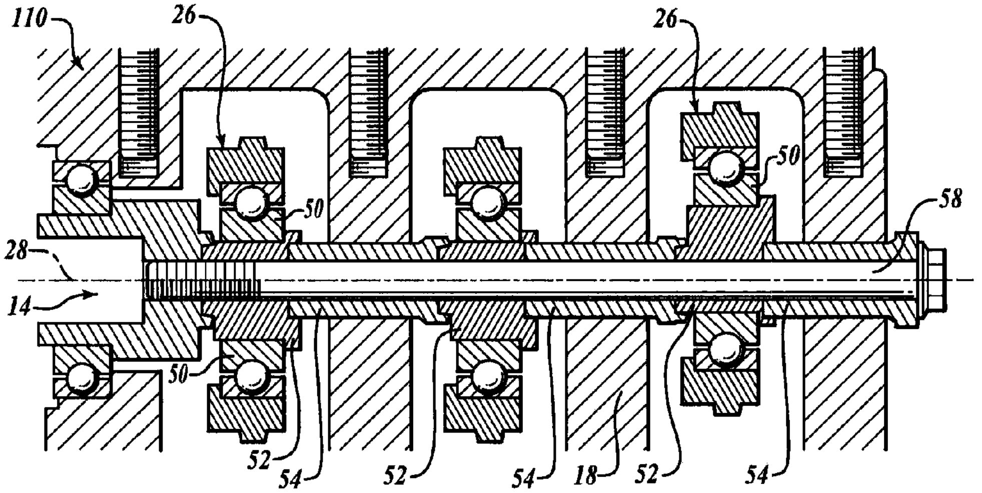
FIG. 6 is a diagram of a partial cross-sectional view of the shaft of FIG. 4 installed in the pump housing of FIG. 2 in accordance with one aspect of the present teachings.
Figure 7:
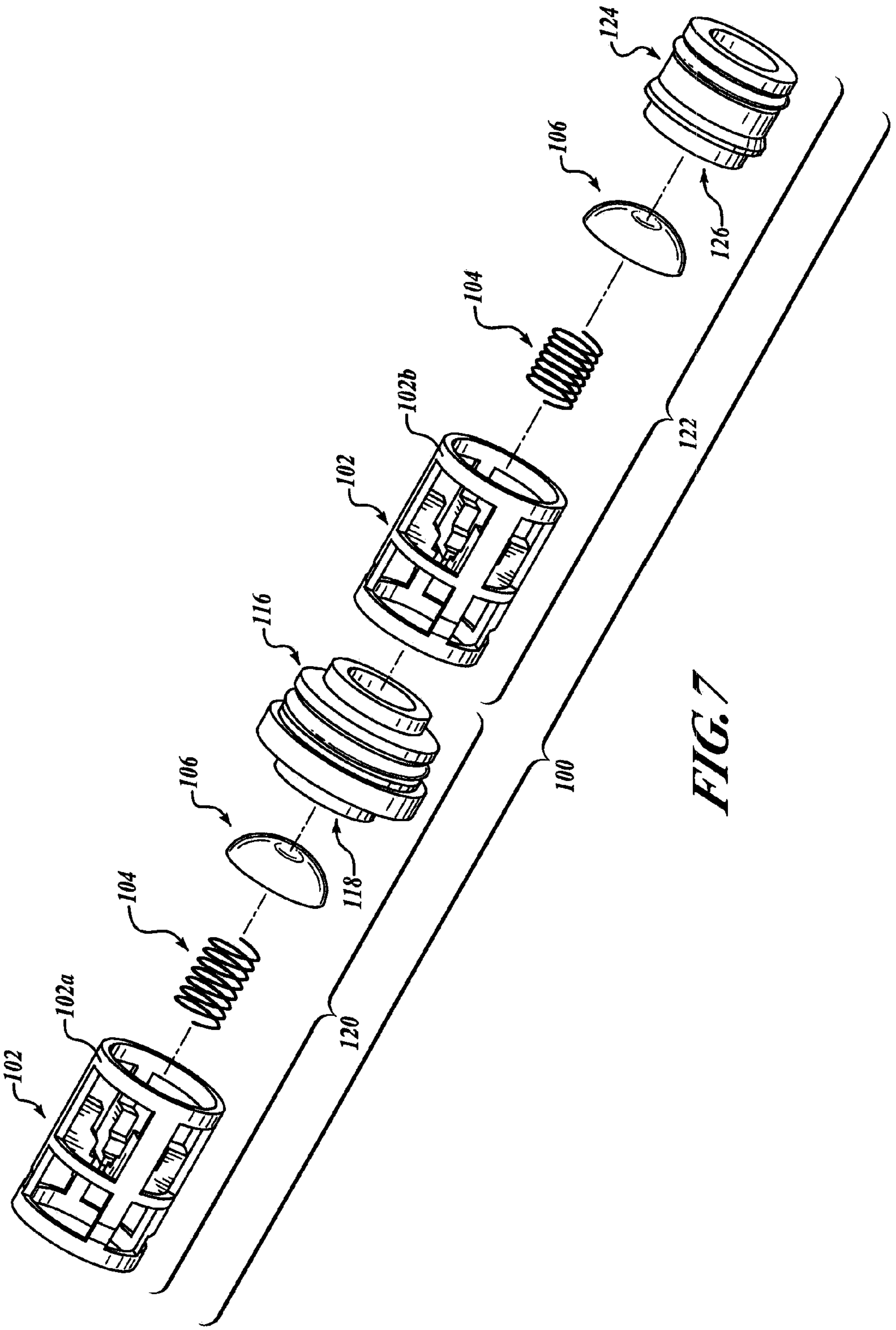
FIG. 7 is an exploded assembly view of a valve assembly in accordance with various aspects of the present teachings.

With reference to FIGS. 4, 5 and 6, the shaft 14 can include several components that can be assembled to form a solid shaft to transfer power from a motor or an engine (not shown) to the fluid pump 10 by driving the shaft 14 to activate the pistons 16, as discussed above. The shaft 14 can include one or more of the following: bearings 50, extension members 51, eccentric pieces 52 and intermediate pieces 54. The bearings 50 and the eccentric pieces 52 can be mated together to form an eccentric drive section 56 (FIG. 5) that can be associated with each of the pistons 16 of the fluid pump 10 (FIG. 2). It will be appreciated in light of the disclosure that the shaft 14 can include the bearing 50, the eccentric piece 52, and the intermediate piece 54, i.e., the eccentric drive section 56, for each of the pistons 16 in the pump housing 18. As such, the various pieces of each of the eccentric drive sections 56 can be aligned into one long shaft and held together by a central fastener 58, as shown in FIG. 6.

With reference to FIG. 5, each of the eccentric pieces 52 and the intermediate piece 54 can mate together through the use of various keyed and mating portions. In one example, the eccentric piece 52 can have a male end 60 and a female end 62. The intermediate piece 54 can have a male end 64 and a female end 66.

The male end 60 of the eccentric piece 52 has a keyed portion 68 that can be a flat section or surface that is configured to mate with the female end 66 of the intermediate piece 54. The female end 66 of the intermediate piece 54 can also have a keyed portion 70 that can be a flat section or surface configured to mate with the keyed portion 68 of the male end 64 of the eccentric piece 52. In addition, the male end 64 of intermediate piece 54 has a keyed portion 72 that can be a flat section or surface configured to mate with a keyed portion 74 that can be a flat section or surface defined by the female end 66 of the eccentric piece 54.

These keyed portions 68, 70, 72, 74 can be configured to self-align such that when the keyed or mated portions 68, 70, 72, 74 are set in place with their complementary portions, the eccentric pieces 52 of the shaft 14 are rotateably positioned such that each eccentric piece 52 is oriented so that it is one hundred twenty degrees (120°) from the previous eccentric piece 52 in an example where the pump housing 18 is configured to include three pistons 16. It will be appreciated in light of the disclosure that the exemplary one hundred twenty degree (120°) rotational position and timing is suitable for at least a three piston configuration of the pump housing 18. Other timing configurations can be implemented, e.g., one hundred eighty degrees (180°) for a two piston assembly or ninety degrees (90°) for a four piston assembly.

Figure 8:
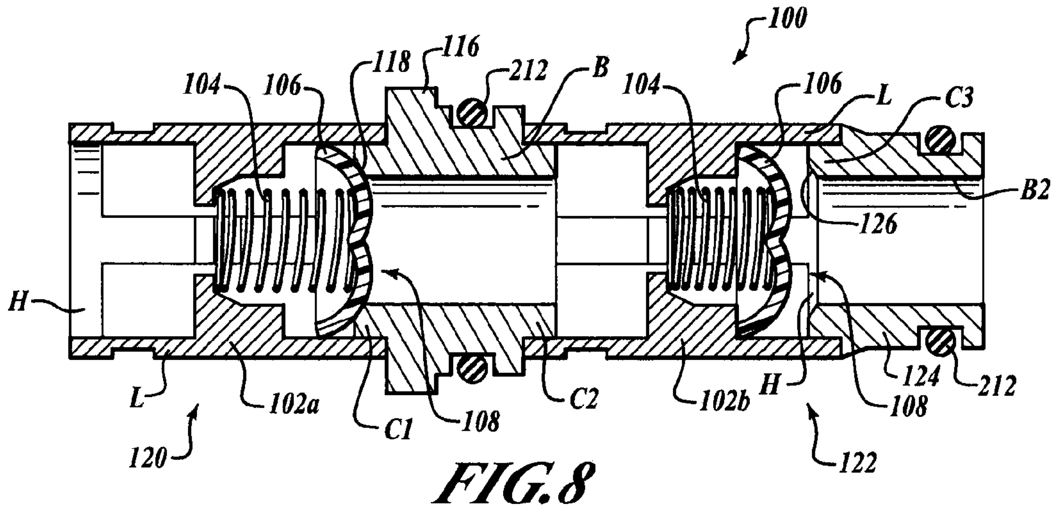
FIG. 8 is a side view of the valve assembly of FIG. 7 in an assembled condition.
Figure 9:
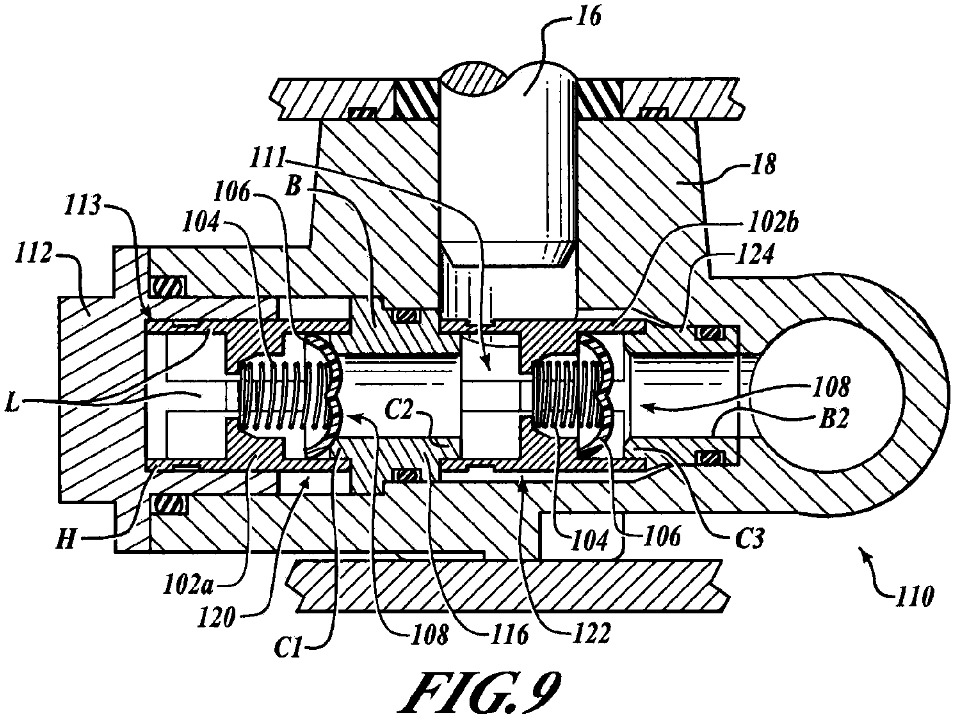
FIG. 9 is a diagram of a partial cross-sectional view of the valve assembly of FIG. 7 installed within the pump housing of FIG. 2 in accordance with the present teachings.
Figure 10A:
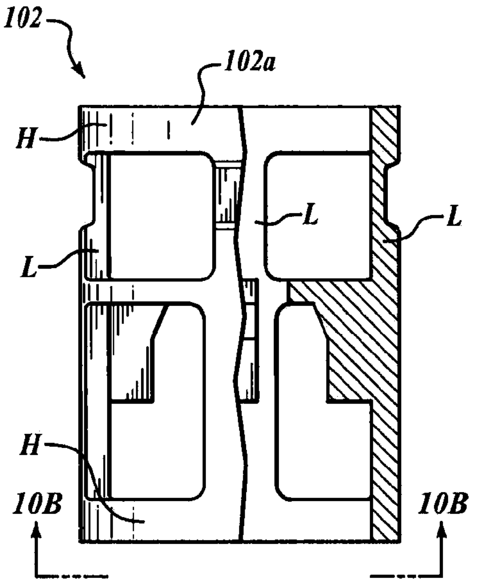
FIG. 10A is a diagram of a partial cross-sectional view of a cage member that holds individual components of each valve mechanism in the valve assembly of FIG. 7.
Figure 10B:
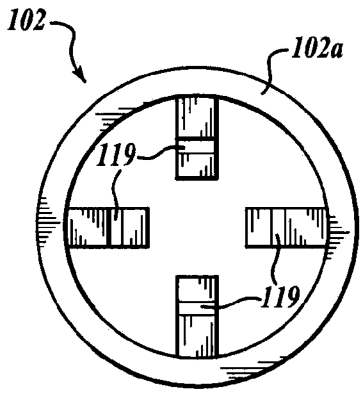
FIG. 10B is a top view of the cage member of FIG. 10A.

With reference to FIGS. 7 to 11, a valve assembly 100 can include one or more cage members 102 comprising hoop-shaped elements H coupled by longitudinally-extending members L, and that can each contain a spring 104 and a seal 106 to form a poppet valve 108. With reference to FIG. 9, the valve assembly 100 can be inserted into a pump head 110 of the pump housing 18. The pump head 110 can define a cavity 111. A valve plug member 112 can be inserted into an opening 113 that can receive the valve plug member 112 to seal the cavity 111 in the pump head 110.

The valve plug member 112 can be used to further compress the valve assembly 100 in the pump head 110. The valve assembly 100 can be intentionally compressed into the pump head 110 and can be shown to remove and/or reduce any spacing (e.g., from manufacturing tolerances) to form a tight seal in the pump head 110 and can prevent the valve cage 102 from moving within the cavity 111.

In some instances, compression of a valve assembly can cause a cage member to torque or skew which can negatively affect the tight seal in a pump head. In one aspect of the present teachings and with reference to FIG. 11, a pre-designed crumple zone 114 can be incorporated into the cage member 102 and can be shown to deflect forces that exceed the strength of the cage member 102. In this regard, the crumple zone 114 can allow the cage member 102 to crumple at a pre-determined location and in a pre-determined direction enabling the cage member 102 and valve assembly 100 to retain a tight seal in the pump head 110 while avoiding the unwanted torque and skewing of previous cage members.

With reference to FIG. 8, the valve assembly 100 can include two poppet valves 108 so that each of the cage members 102, (i.e., a cage member 102_a_ and a cage member 102_b_) can connect to a connector member 116 having a connector body B. The cage member 102_a_ can be included in a first valve mechanism 120 that includes a poppet valve 108. The cage member 102*b* can be included in a second mechanism 122 that includes another poppet valve 108. The connector member 116 can also include a valve sealing surface 118 that can receive the seal 106, and a first and second coupling neck C1 and C2 for receiving the cage members 102*a* and 102*b* respectively. The seal 106 in the first valve mechanism 120 is urged toward the valve sealing surface 118 by the spring 104 that can be held in a spring seat 119 formed in the cage member 102.

The cage member 102*b* associated with the second valve mechanism 122 can attach to the other side of the connector member 116 opposite the valve sealing surface 118. The second cage member 102*b* can connect between the connector member 116 and an end member 124, the end member 124 having a third coupling neck C3, a valve sealing surface 126 and a second bore B2. The seal 106 associated with the second valve mechanism 122 can seal against the valve sealing surface 126 on the end member 124.

Figure 12:
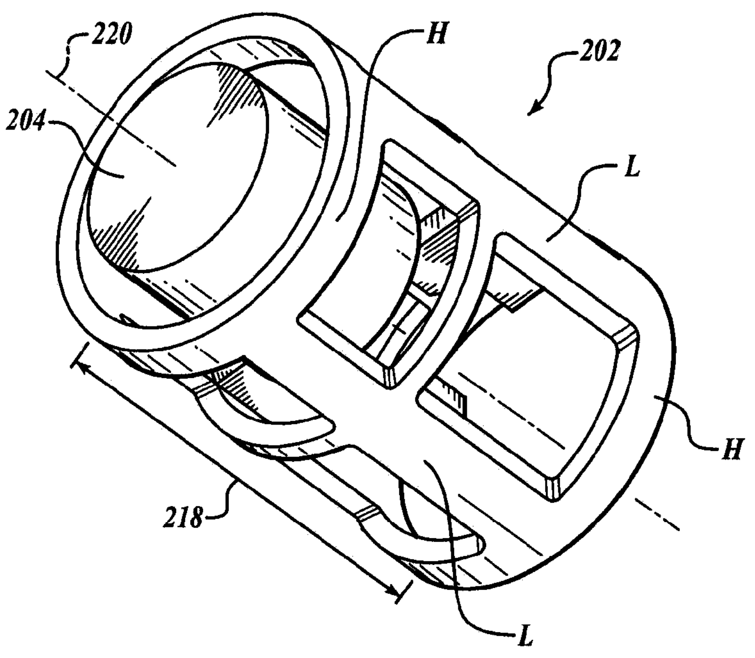
FIG. 12 is a perspective view of a cage member and a compliant member constructed in accordance with the present teaching.
Figure 13:
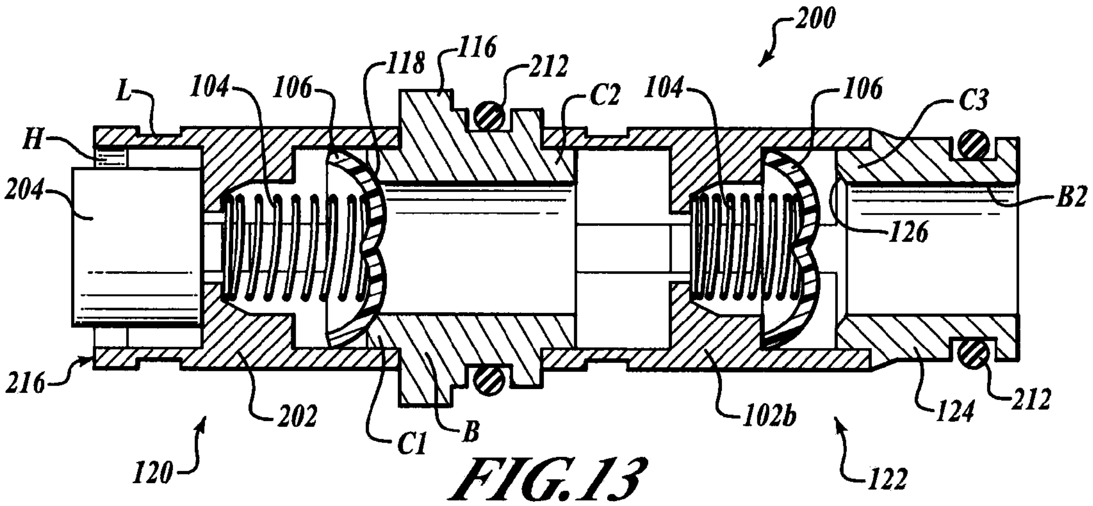
FIG. 13 is a side view of a valve assembly including the compliant member and the cage member of FIG. 12 constructed in accordance with another aspect of the present teachings.
Figure 14:
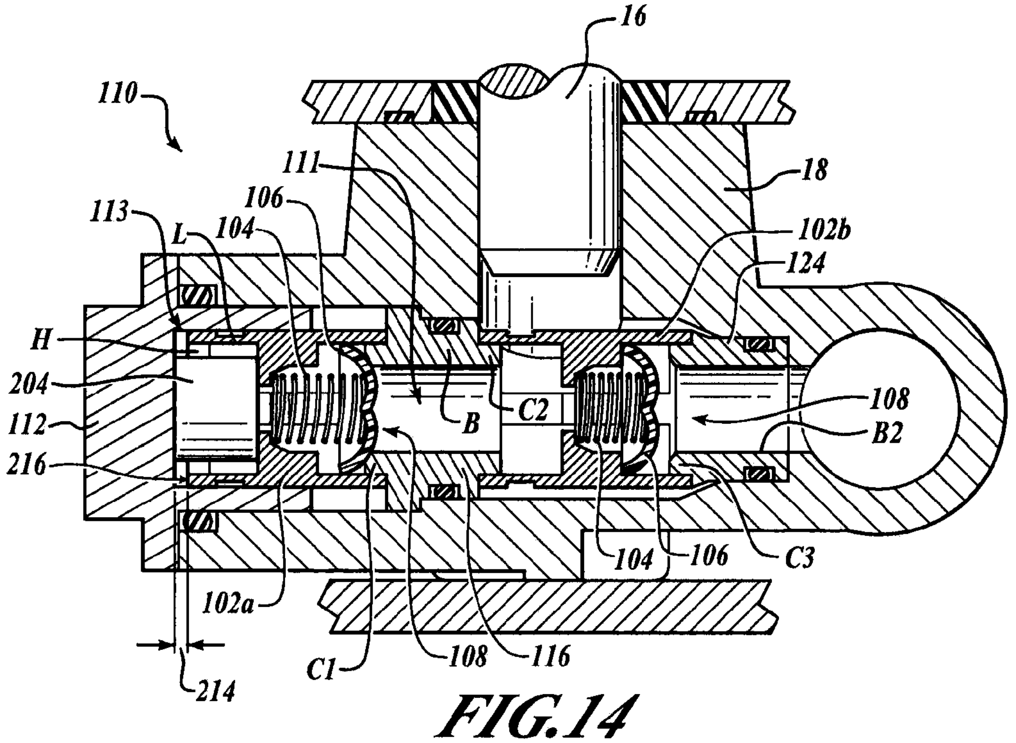
FIG. 14 is a cross-sectional view of the pump housing of FIG. 2 including the valve assembly of FIG. 13 constructed in accordance with the present teachings.

With reference to FIGS. 12 to 14, a valve assembly 200 can include one or more of the cage members 102 that can contain the spring 104 and the seals 106 to form one of the poppet valves 108. In one example, the cage member 102*a* can be omitted in lieu of a cage member 202. The cage member 202 can be disposed in the valve assembly 200 so that the cage member 202 can be between the connector member 116 and the valve plug member 112.

Figure 11:
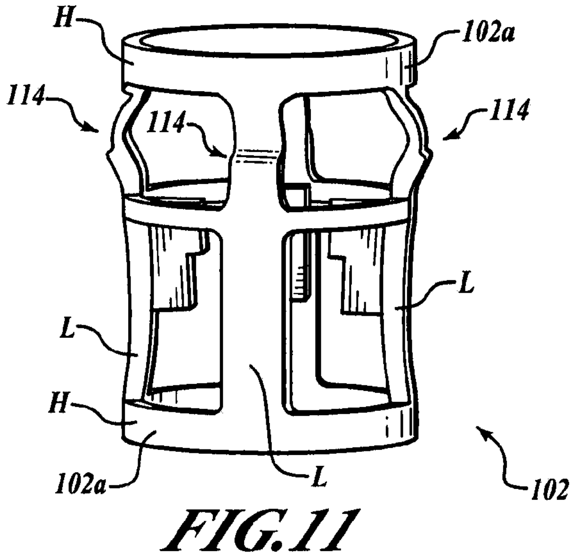
FIG. 11 is a side view of the cage member of FIG. 10A showing the cage member in a crumpled state in accordance with one aspect of the present teachings.

A compliant member 204 can be disposed between the valve plug member 112 and the connector member 116. In this regard, the valve assembly 200 can be inserted into the pump head 110 and then the valve plug member 112 can be used to cap and compress the valve assembly 200 into the pump head 110. The cage member 202 can be designed to be relatively more resilient relative to the cage member 102*a* having the crumple zone 114 as shown in FIG. 11. The compliant member 204 between the cage member 202 and valve plug member 112 can seat the entire valve assembly in the pump head 110 to prevent, among other things, the valve cage 102, 202 from moving within the cavity 111 of the pump head 110.

The cage member 202 can also be configured to hold the spring 104 and the seal 106 such that the spring 104 can push the seal 106 against the valve sealing surface 118 on the connector member 116 to form one of the poppet valves 108. The valve assembly 200 therefore can provide the same pumping functionality as the valve assembly 100. In this regard, the valve assembly 200 can be similar to the valve assembly 100 from the connecting member 116 to the end member 124 such that the second valve mechanism 122 is the same in the valve assembly 100 and the valve assembly 200. In this example, the second cage member 102*b* can be resilient or have a similar crumple zone 114 (FIG. 11).

In operation, the first valve mechanism 120 and the second valve mechanism 122 can open and close in accordance with the position of the piston 16 to divert water from a fluid source to a wand (not shown) or other such tool associated with the pressure washer. Specifically, as the piston 16 travels upward, the second valve mechanism 122 opens to allow water into the pump head 110 from a fluid source, as illustrated in FIGS. 8, 9, 13 and 14. As the direction of the piston 16 changes and begins to travel downward, the second valve mechanism 122 closes and the first valve mechanism 120 opens. At this point, the piston 16 pushes the fluid through the first valve mechanism 120 and toward the suitable tools or other such components associated with the pressure washer. The first valve mechanism 120 closes (as illustrated in FIGS. 8, 9 13 and 14) as the piston 16 changes direction again. It will be appreciated in light of the disclosure that the piston 16 can drive the fluid through the first valve mechanism 120 and into a suitable manifold 210 (FIG. 2) that can collect the fluid in the pump head 110 associated with each of the pistons 16 in the pump housing 18.

With reference to FIGS. 9 and 14, the cage members 102*a*, 102*b*, 202 can seal within the pump head 110 using suitable seals 212. The cage member 202 (FIG. 14) unlike the cage member 102*a* (FIG. 9) is generally shorter such that a distance 214 between an end 216 of the cage member 202 and the valve plug member 112 is well shorter than a length 218 of the cage member 202. In this regard, the compliant member 204 between the cage member 202 and the valve plug member 112 can take up a space that was otherwise occupied by the longer cage member 102 relative to the cage member 202.

By tightening the valve plug member 112 into the pump head 110, the valve plug member 112 can seat the valve assembly 200 but can be shown to not cause the cage member 202 to distort or skew due to the positioning of the cage member 202. To this end, the cage member 202 can be shorter and more structurally rigid relative to the cage member 102*a*. In one example, the axial and/or torsional rigidity of the cage member 202 along a cage member axis 220 (FIG. 12) can be greater than the force required to deform the compliant member 204

Figure 15A:
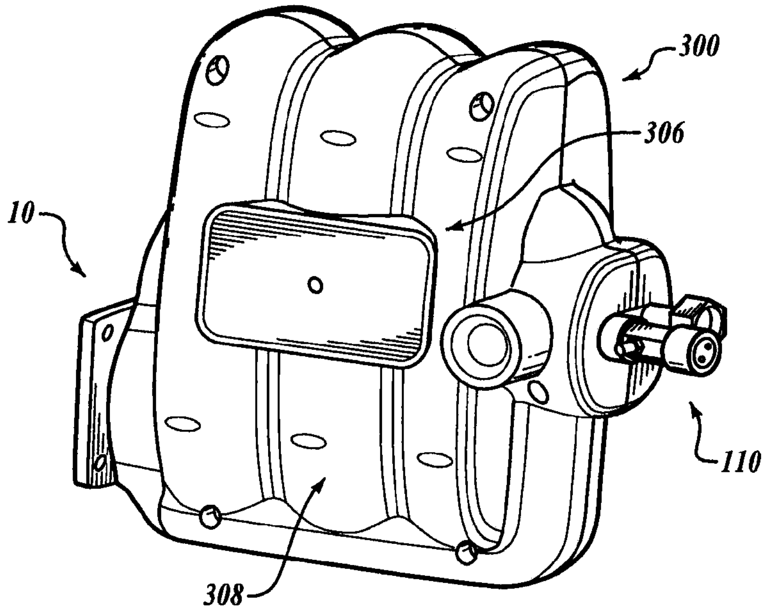
FIG. 15A is a perspective view of an enclosure that at least partially covers the fluid pump of FIG. 2 in accordance with another aspect of the present teachings.
Figure 15B:
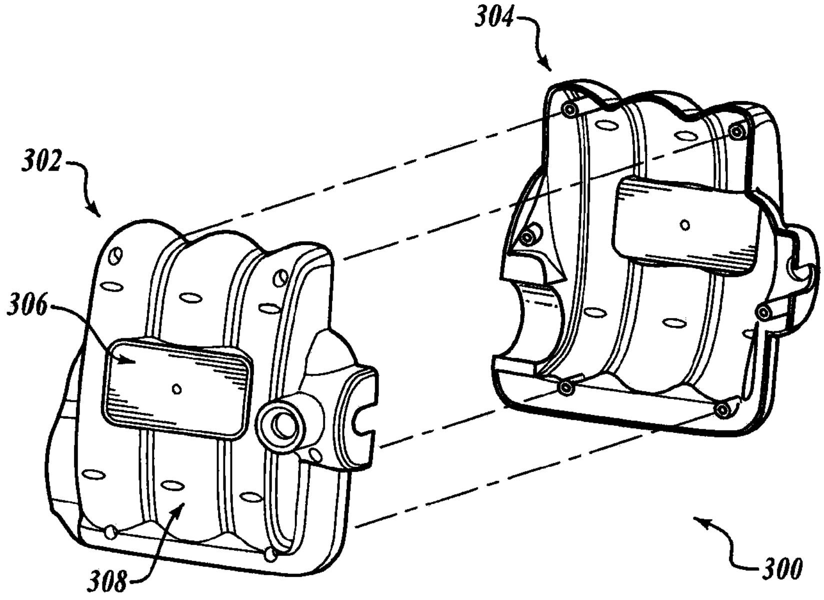
FIG. 15B is an exploded assembly view of two housings that form the enclosure of FIG. 15A.

With reference to FIGS. 15A and 15B, an enclosure 300 can be fitted around the fluid pump 10 so as to provide at least a decorative and/or acoustic cover to the pump housing 110 and other portions of the fluid pump 10. The enclosure 300 can be assembled from two complementary housings: a housing 302 and a housing 304. Each of the housings 302, 304 can be brought together and fitted around portions of the fluid pump 10 as shown in FIG. 15A with suitable fasteners, clips, etc. The enclosure 300 as shown in FIG. 15A can also include a generally rectangular frame 306 on a surface 308 of the enclosure 300. The rectangular frame 306 can be used, for example, to show certain brand names, logos, model information, etc.

Figure 16:
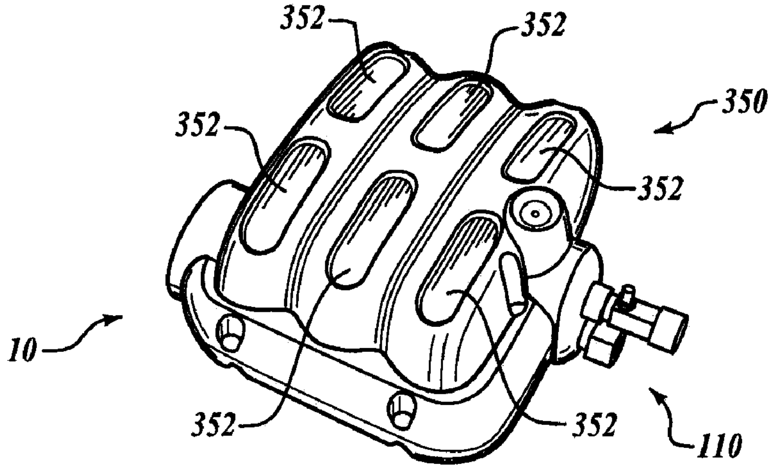
FIG. 16 is a perspective view of an enclosure having elongated grooves in accordance with another aspect of the present teachings.

With reference to FIG. 16, an alternative exemplary enclosure 350 is shown that can be similar to the enclosure 300, as shown in FIG. 15A. The enclosure 350 can include one or more elongated grooves 352 that may each be configured (the same or differently) with different shapes, sizes, colors or textures to add to at least the appearance and/or acoustic dampening of the enclosures 300. In one example, the elongated grooves can be configured with texture and color similar to that of a cast aluminum.

Figure 17:
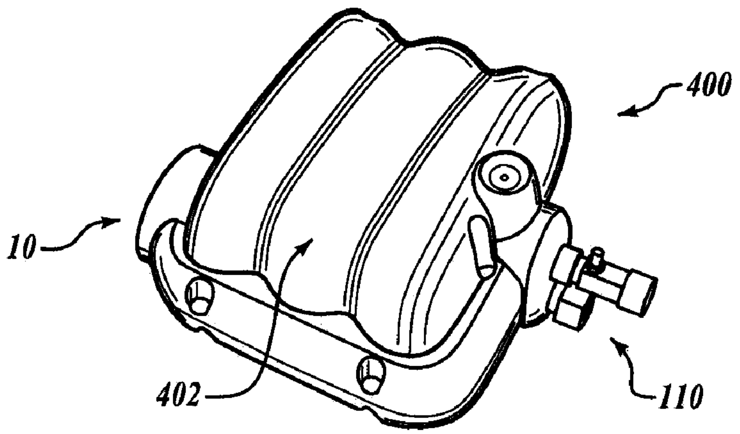
FIG. 17 is a perspective view of a pump enclosure without a frame on the enclosure of FIG. 15A in accordance with yet another aspect of the present teachings.

With reference to FIG. 17, an alternative exemplary enclosure 400 is shown that can be similar to the enclosure 300, as shown in FIG. 15A. The enclosure 400, however, can omit the rectangular frame 306 (FIG. 15A) from a surface 402.

While specific aspects have been described in the specification and illustrated in the drawings, it will be understood by those skilled in the art that various changes can be made and equivalence can be substituted for elements and components thereof without departing from the scope of the present teachings, as defined in the claims. Furthermore, the mixing and matching of features, elements, components and/or functions between various aspects of the present teachings are expressly contemplated herein so that one skilled in the art will appreciate from the present teachings that features, elements, components and/or functions of one aspect of the present teachings can be incorporated into another aspect, as appropriate, unless described otherwise above. Moreover, many modifications may be made to adapt a particular situation, configuration or material to the present teachings without departing from the essential scope thereof. Therefore, it is intended that the present teachings not be limited to the particular aspects illustrated by the drawings and described in the specification as the best mode presently contemplated for carrying out the present teachings but that the scope of the present teachings include many aspects and examples following within the foregoing description and the appended claims.

What is claimed is:

1. A pressure washer pump comprising:

a pump housing that defines a longitudinally-extending cavity with an opening at one end thereof;

a valve assembly disposed in the longitudinally-extending cavity such that a longitudinal axis of the valve assembly is coincident with a longitudinal axis of the longitudinally-extending cavity, the valve assembly comprising a first poppet valve, a second poppet valve, a connector member and an end member, wherein each of the first and second poppet valves comprises a cage, a valve spring, and a seal, wherein the cage comprises a plurality of axially spaced-apart hoop-shaped elements, a valve spring seat, and a plurality of longitudinally-extending members coupling adjacent ones of the hoop-shaped elements to one another, wherein the valve spring seat comprises a plurality of generally L-shaped tabs, each of the L-shaped tabs being integrally formed with an associated one of the longitudinally-extending members, wherein each of the longitudinally-extending members has a zone of reduced cross-sectional area that is configured to buckle when an axially directed force in excess of a predetermined crushing force is applied to the cage, the valve spring being received between the L-shaped tabs in the cage and the seal to bias the seal outwardly from the valve spring seat, the connector member having a connector body, a first coupling neck and a second coupling neck formed on opposite sides of the connector body, a first bore that is formed through the connector body, and a first seal seat, the cage of the first poppet valve being mounted about the first coupling neck, the seal of the first poppet valve being biased into sealing engagement with the first seal seat, the cage of the second poppet valve being mounted about the second coupling neck, the end member having a third coupling neck, a second bore and a second seal seat, the cage of the second poppet valve being mounted about the third coupling neck, and the seal of the second poppet valve being biased into sealing engagement with the second seal seat;

a plug member coupled to the pump housing and closing the opening; and a compliant member disposed between the plug member and the cage of the first poppet valve.

2. The pressure washer pump of claim 1 further comprising a reciprocating piston coupled to said pump housing, said piston opens said first poppet valve when said piston travels in a first direction and opens said second poppet valve when said piston travels in a second, opposite direction.

3. The pressure washer pump of claim 1 wherein said compliant member is configured to deform under a value of a force that is less than a value of the predetermined crushing force.

4. The pressure washer pump of claim 1, wherein the compliant member is received into the cage of the first poppet valve and abuts the L-shaped tabs on a side opposite the valve spring.

5. The pressure washer of claim 1, wherein a portion of the cage of the first poppet valve surrounds an outer periphery of the compliant member.

* * * * *